3,528,933
LATENT CURING EPOXY RESIN SYSTEMS
Calvin K. Johnson, White Bear Lake, Minn., assignor to Minnesota Mining and Manufacturing Company, St. Paul, Minn., a corporation of Delaware
No Drawing. Filed May 10, 1966, Ser. No. 548,843
Int. Cl. C08g 22/44, 30/02
U.S. Cl. 260—2                                  1 Claim

ABSTRACT OF THE DISCLOSURE

A curable resin composition comprises a flowable, curable resin and a latent curing agent distributed throughout the resin within a solid, stable organic crystalline inclusion compound unreactive in the crystalline form with the resin. The inclusion compound is a crystalline host material and contains within the crystalline structure a guest material which will cure the resin when released from the crystalline structure by heat or other means.

---

The present invention relates to latent curing resin systems which are stable at normal ambient temperatures but which cure rapidly at moderately elevated temperatures or under other controlled conditions and to curing agents and methods for curing such resin systems.

Epoxy and polyurethane resin systems often are prepared for use as two-part systems in which the two parts are mixed shortly before use. In order to eliminate this mixing step and the likelihood of non-uniform results which it entails, various systems have been proposed for producing latent curing mixtures, particularly in the case of epoxy resin systems. For example, it has been proposed in U.S. Pat. 2,717,885 to Greenlee, issued Sept. 13, 1955, to add a catalyst to an epoxy resin system in the form of a chemically reacted addition product of the catalytic material which, when heated, will decompose to release the catalytic material. Such systems have not, however, been found to be truly latent due to the fact that the compounds are somewhat reactive even at room temperatures; thus the materials have a limited shelf life. Moreover the rate of cure with such systems is slow even at elevated temperatures. It has also been proposed to encapsulate the curing agents in a protective colloid material such as gelatin, see U.S. Pat. 3,018,258 to Meier et al., issued Jan. 23, 1962. Such capsules, however, are subject to premature rupture in the handling of the materials and also to leaching out of the capsule fill over a period of time.

The present invention provides a new class of latent curing agents which have improved resistance to leaching or gradual chemical reaction, and which can withstand normal handling. It has been found that by adding a curing agent which is trapped within the crystalline structure in the form of an inclusion compound that the curing agent will remain in the latent, potentially reactive state for extended periods of time and may later be released when desired to cause hardening of the resin system. Since the chemical reactivity of the curing agents is not altered, cures take place rapidly upon release of the curing agent. Curing agents are provided which may either act as catalysts, or as polyfunctional crosslinking agents, or both.

Curing agents of this invention can be used to provide latent curing systems based on a wide variety of resins such as epoxies, polyurethanes, polyesters, polyamides, polyacids, polyanhydrides, polyimides, polyacrylates, etc.

In accordance with a further embodiment of the invention, flowable resin systems are provided which contain a latent curing agent which on release of the entrapped material from the crystals causes a foaming reaction. Thus compositions are provided which can be poured and then foamed and cured at a desired later time. By appropriate selection of the reactive components, compositions can be provided to produce either elastic or rigid foams.

In a further embodiment of the invention both the host and guest materials are reactive with the resin, and thus no "dead weight" is added to the resin system in the form of non-reactive fillers.

Inclusion compounds as the term is used herein are intended to mean compositions in which the one or more component is physically trapped within the crystal lattice framework of another component. This framework may be in the form of channels, cages or layers. Since the two compounds are not chemically reacted they are not present in stoichiometric proportions, but rather present in constant proportions dependent upon the molecular dimensions of the components. Clathrate compounds are inclusion compounds in which molecules of one substance are completely caged within the other. Compounds formed by urea and thiourea crystals are of the channel type, in which the host crystals are wrapped around the molecule of the guest substance. Inclusion compounds have also been variously referred to in the literature as "co-crystal adducts," "inclusion complexes" or "occlusion complexes."

In order to be useful as latent curing agents the crystalline materials should remain insoluble in the resin system at normal ambient temperatures, i.e. at least up to about 45° C. In the case of crystalline materials which melt at moderately elevated temperatures, for example 90° to 140° C., the resin system containing the compounds may readily be cured by heating to a temperature at which melting of the crystals and release of the entrapped curing agent occurs. Frequently the release occurs at a temperature somewhat below that of the melting point of the host crystalline material due to a solubilizing effect of the liquid resin system.

It has further been found that the entrapped curing agents can be released without heating by subjecting the crystals to ultrasonic vibrations. Breakup of the crystalline structures has been observed using vibrations having a frequency of about 80 kilocycles to 2 megacycles and a power of about 3 watts or more per square centimeter. By using this technique it is possible to apply a resin in a difficult-to-reach place or on heat sensitive materials and then to later trigger the curing reaction without the need for application of heat.

In order to provide a latent curing agent in which the ratio of the reactive material to the crystalline material, which often simply becomes a filler in the cured resin, should be as high as possible and therefore it is preferred to use crystals having as large channels or cages as possible. Therefore the preferred crystalline materials are compounds such as urea, thiourea, and Dianin's compound. The latter, which has the formula $C_{18}H_{20}O_2$ can be prepared according to the techniques set forth in Journal of Chemical Society 2013 (London, 1956).

Two basic methods can be used to prepare inclusion compounds. The host compound may be dissolved directly in the hot liquid guest compound and crystals of the inclusion compound obtained by cooling the resulting solution. Alternately both the guest and the host components may be dissolved in a hot solvent which does not form inclusion compounds with the host compound, or has less tendency to form compounds than the guest molecule, and collecting the inclusion compound crystals which form on cooling.

A large variety of materials which act as curing agents in various resin systems may be entrapped in inclusion compounds. Examples are primary, secondary, and tertiary amines, glycols, organo-metallic compounds, halides, such as $BF_3$, etc. It will be understood that the host and guest materials are so selected that a chemical reaction does not occur between the two.

It has been discovered that in the case of inclusion compounds in which the host crystalline material is either urea or thiourea and in which the entrapped curing agent is a primary or secondary amine, a portion of the amine reacts with the urea or thiourea to give $NH_3$ which serves as a blowing agent for the resin composition in accordance with the following reaction:

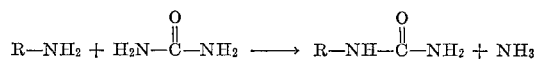

This is surprising since simple mixtures of urea or thiourea and the same amine or resin cure under the same conditions without foaming. It is hypothesized that the $NH_3$ evolution reaction takes place in the case of the inclusion compounds because of the very close physical proximity of the amine and the urea or thiourea. Tertiary amines, even when trapped in urea or thiourea, do not undergo this reaction and thus form non-cellular resins when employed as latent curing agents.

Most known materials suitable as host materials merely serve as a carrier for the reactive guest molecules and remain present in the cured resin as a filler. Excessive amounts of such fillers must be avoided in order to avoid adding too much dead weight thus impairing the properties of the cured resin. This problem can be overcome by using a polyfunctional host compound which can cure into the resin system and thus contribute to the properties of the cured resin. Examples of such host materials are desoxycholic acid and 2,2,4-trimethyl-4-(2,4-dihydroxyphenyl)-chroman. The latter is a novel host material which may be prepared by reacting 2,2,4-trimethylchromen with resorcinol in an inert solvent, e.g., ethers or hydrocarbons using mineral acid or Lewis acid catalysts, in accordance with the following reaction:

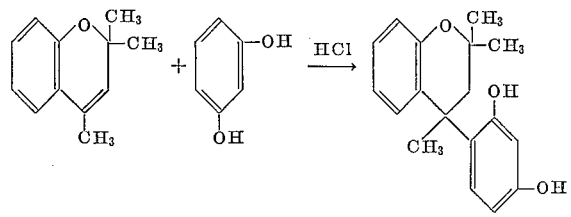

The amine used with this clathrating agent must be of a type which will not react chemically with the host compound to form a phenol salt. An example of such an amine is 0-dimethylaminomethylphenol, a widely used tertiary amine catalyst.

Examples of resin systems which may be used in this invention are epoxy resins which contain more than one and generally about two oxirane groups per average molecular weight. Examples of such resins are liquid polyglycidyl ethers of polyhydric phenols such as bisphenol A which usually have slightly less than two oxirane groups per average molecular weight (for example the resin available commercially under the trade designation "Epon 828"). An example of a resin having more oxirane groups are polyglycidyl ethers of phenol formaldehyde novolaks (for example those available commercially under the trade designation "D.E.N. 438") which have an average of 3.6 oxirane groups per molecule. Examples of other epoxy resins that are useful alone or when mixed with other resins are polyglycol, polyepoxides, for example diglycidyl ether of polypropylene oxide (available commercially under the trade designation "D.E.R. 736") or resins made by condensing epichlorohydrin and glycerine to give di- and tri-epoxides having a functionality of about 2.2 (e.g. "Epon 812"). Still further examples of suitable resins are products made from the reaction of bisphenol A diglycidyl ethers and aliphatic dimer acids (e.g. "Epon 872") and higher molecular weight solid epoxy resins made by condensing bisphenol A and epichlorohydrin (e.g. "Epon 1001").

The curing agents of the present invention may also be used to cure isocyanate terminated urethane prepolymers. Such prepolymers are generally synthesized by reacting a polyol having two or more hydroxyl groups per molecule with two or more equivalents of a polyisocyanate molecule. This gives a urethane prepolymer having two or more isocyanate end groups per molecule which may be cured by chain extension or crosslinking with further amounts of polyols or polyamines.

Polyacids, polyanhydrides or polyimides having anhydride end groups may be crosslinked with polyamines present as guest molecules in an inclusion compound to give cured polyamides. Resins cured by the free radical initiation of polymerization of olefinically unsaturated linkages to form thermosetting resins such as polyester and polyacrylate resins may be made latent by adding inclusion compounds of free radical initiators such as peroxide catalysts, which are released at some later time by heating the sample. Latent curing polyester resin systems can also be made by mixing inclusion compound amines with ester-terminated resin systems.

The following examples, in which all proportions are given in parts by weight unless otherwise indicated, will serve to illustrate but not limit the invention.

EXAMPLE I

A urea-hexamethylene diamine channel compound was prepared by dissolving 5 gm. of urea in 20 ml. of warm methanol and adding 2.0 gm. of hexamethylenediamine. The crystals that formed on cooling to room temperature were filtered, washed with methanol and chloroform, and vacuum dried to give 6.3 gm. of crystals, M.P. 95–110° C. Elemental analysis: C, 31.6%; H, 8.8%; N, 36.1%. Thiourea channel compounds of dimethylaminomethyl phenol, m-xylylene diamine and hexamethylene diamine were prepared by the same method.

Rigid epoxy foams

The heating of mixtures of polyglycidyl ethers of polyhydric phenols with urea or thiourea channel compounds of polyamines at 90 to 150° C. generally gives rigid epoxy foams.

For example, a mixture was prepared of a liquid diglycidyl ether of bisphenol A, with a molecular weight of 375 and an epoxy equivalent of 192 ("Epon 828"), and the urea channel compound of hexamethylenediamine. 24 gm. of the resin and 15 gm. of urea hexamethylenediamine channel compound, crystals less than 250 microns in size, were thoroughly mixed and heated at 95° C. for 1 hour to give a rigid white foam having a density of 12.8 lbs./cu. ft. and a compressive strength of 87 p.s.i. Such a mixture has a useful shelf life of 2–3 months. Urea channel compounds of triethylenetetramine and tetraethylenepentamine may also be used.

Polyglycidyl ethers of phenol formaldehyde novolak resins also give rigid, very strong, epoxy foams when heated with urea polyamine channel compounds. For example, 7.8 gm. of such a resin having an epoxy gram equivalent weight of 178 (obtained commercially from Dow Chemical Co. under the trade designated "D.E.N. 438") were mixed with 5.0 gm. of the urea hexamethylenediamine urea channel compound (0–420 micron crystals) and the resulting paste heated at 110° C. for 15 minutes to give a strong rigid foam. Such a mixture has a useful shelf life of 2 months or more whereas the amine gels the resin in 12 hours or less.

Flexible epoxy foams

Polyglycidyl ethers of aliphatic polyglycols give flexible foams when heated above 90° C. with urea polyamine channel compounds. For example, a mixture of 6 gm. of such a resin having a molecular weight of 306 and an epoxy equivalent weight of 150, obtained commercially from Shell Chemical Corp. under the trade designation "Epon 812" and 6 gm. of hexamethylenediamine urea channel compound, 0–420 micron crystals, was placed in an oven at 80° C. and the temperature raised to 110° C. over a 15 minute period. A fine grained, flexible foam was obtained. Similarly, a flexible foam was obtained when a mixture of 5.6 gm. of hexamethylenediamine urea channel compound and 7.6 gm. of "D.E.R. 736" was placed in an oven at 80° C. and the temperature raised to 110° C. over a 15 minute period.

Although it is not a polyglycidyl ether of an aliphatic polyol, "Epon 872" which is a condensation product of bisphenol A diglycidyl ether and an aliphatic dimer acid, gives flexible tough epoxy foams. For example, a mixture of 7 parts by weight of "Epon 872" and 2 parts by weight of hexamethylenediamine urea channel compound, 0–250 micron crystals, was placed in an oven at 80° C. and the temperature raised to 110° C. over a 15 minute period. A pale yellow, tough fine grained foam was obtained.

EXAMPLE II 136.7 gm. (0.1 equivalent) of a polypropylene oxide triol, molecular weight=4100, was added slowly to 17.4 gm. (0.1 mole) of toluene-2,4-diisocyanate and the mixture stirred for 16 hours to give a viscous —NCO terminated urethane prepolymer. Polyurethane foams were obtained by mixing 9.24 gm. of the prepolymer with 1.50 gm. of urea-hexamethylene diamine crystals of Example I and heating the mixture at 120° C. for 10 minutes. A flexible polyurethane-urea foam was obtained. The prepolymer containing the inclusion compound crystals was stable at room temperature for about 4 months, whereas addition of the pure amine caused immediate gelling of the prepolymer.

EXAMPLE III

A channel compound of triethylene tetramine in urea was formed by dissolving urea directly in an excess of the hot amine, i.e. 5 gm. of urea was dissolved in 20 ml. of triethylenetetramine at 80–90° C. and allowed to cool to room temperature. The crystals were collected, washed with chloroform, and dried to give 6.2 gm. of channel compound, M.P. 95–110° C. Elemental analysis; C, 27.8%; H, 8.1%; N, 42.6%. This channel compound when used as a curing agent for epoxy resins produced rigid and flexible foams essentially identical to those obtained in Example I. A flexible polyurethane-urea foam was obtained by mixing the inclusion compound with the prepolymer of Example II and heating above 100° C.

EXAMPLE IV

A mixture of 5 parts of Dianin's compound and 2 parts by weight of o-dimethylaminomethylphenol was heated until a clear solution was obtained and allowed to cool. The crystals were filtered, washed with toluene, and vacuum dried to give the clathrate, M.P. 154–9° C., N=0.8%. Results of use of the clathrate as a curing agent are given in Table I.

EXAMPLE V

A mixture of 5 parts of Dianin's compound, 2 parts of 1,3-propanediamine and 2 parts by weight of decahydronaphthalene solvent was heated until a clear solution was obtained and allowed to cool. The crystals which formed were filtered, washed with toluene, and vacuum dried to give the clathrate, M.P. 133–145° C., N=3.4%. Results of use of the clathrate as a curing agent are given in Table I.

EXAMPLE VI

A clathrate of imidazole in Dianin's compound was prepared by heating 5 parts by weight of Dianin's compound, 2 parts by weight of imidazole, and 2 parts by weight of Decalin solvent until a clear solution was obtained. The crystals that formed on cooling were filtered, washed thoroughly with water and vacuum dried to give the clathrate, M.P. 145–150° C.

A particularly useful latent curing resin system was obtained by mixing 100 parts by weight of "Epon 828" with 20 parts by weight of imidazole-Dianin's compound clathrate. This mixture gave a strong hard cured resin when heated at 110° C. for 10 minutes. A similar result was obtained when a sample was heated at 90° C. for 30 minutes or when the clathrate of 2-methylimidazole in Dianin's compound was used in place of the imidazole clathrate. The shelf life of these systems are somewhat dependent on the crystal size and the epoxy resin used but is at least 1 to 2 months at 25° C. A mixture of 2 parts by weight of an imidazole (e.g., imidazole, 2-methylimidazole, etc.) in 100 parts by weight of a liquid epoxy resin has a workable pot life of only 24 to 48 hours at 25° C.

Crystals of the imidazole Dianin's compound clathrate was mixed with solid epoxy resins to give free flowing powders which are stable indefinitely at 25° C. but melt and cure rapidly above 100° C. For example, 10 gm. of a solid epoxy resin, "Epon 1001," was powdered and thoroughly mixed with 0.8 gm. of imidazole clathrate and heated at 120° C. for 20 minutes to give a hard cured resin.

EXAMPLE VII

A mixture of 8.0 gm. of "Epon 828" (Diglycidyl ether of Bisphenol A, M.W. 375, epoxy equivalent 192), 8.0 gm. of Dianin's compound clathrate of 1,3-propane diamine was placed in a glass tube having an aluminum foil window which transmitted the ultrasonic irradiation. The tube was placed in a water bath at 25° C. above an ultrasonic transducer. The sample was irradiated with an 800 kilocycle, 80 watt ultrasonic field. The sample temperature rose rapidly to 140° C. and the sample gelled in 3 minutes. On cooling, a hard cured block of resin was obtained. This rapid heating is mainly due to the exothermic reaction of the released amine with the epoxy resin since the ultrasonic field only heated a control sample to 50° C. The gel time of this clathrate in the resin mixture at 50° C. is 7 to 8 days. With a 40 watt, 800 kilocycle, ultrasonic field, a similar sample gelled in 10 minutes. The other epoxy resins and amine clathrates mentioned in this patent application may similarly be cured by ultrasonic irradiation.

TABLE I

| Resin 100 Parts | Dianin's Compound Clathrate | Temp., °C. | Time, min. | Properties | Shelf life at 25° C. in weeks |
|---|---|---|---|---|---|
| 828 [1] | 1,3-propanediamine, 100 parts | 130 | 10 | Clear hard cured | 7 |
| 828 [1] | Ethylenediamine, 100 parts | 140 | 10 | do | 8 |
| 828 [1] | Diethylenetriamine, 100 parts | 140 | 10 | Brittle cured resin | 8 |
| 828 [1] | 2-methylimidazole, 20 parts | 120 | 15 | Strong well cured resin. | 5-6 |
| 828 [1] | 1,4-butanediamine, 100 parts | 140 | 15 | Clear hard cured resin. | 7-8 |
| 828 [1] | 1,2-propanediamine, 100 parts | 130 | 10 | do | 7 |
| 828 [1] | Triethylenetetramine, 100 parts | 140 | 15 | do | 8 |
| 828 [1] | o-Dimethylamino-methylphenol, 100 parts. | 130 | 60 | Brittle resin | 7-8 |
| 1001 [2] | 1,3-propanediamine, 45 parts | 140 | 30 | Clear hard cured resin. | Indefinite |
| 812 [3] | 1,3-propanediamine, 130 parts | 130 | 15 | do | 7 |
| 872 [4] | 1,3-propanediamine, 30 parts | 130 | 15 | Well cured resin | 8 |
| 438 [5] | 1,3-propanediamine, 110 parts | 140 | 15 | Hard cured resin | 8 |
| 736 [6] | 1,3-propanediamine, 120 parts | 130 | 15 | Clear hard cured resin. | 2 |

[1] Diglycidyl ether of bisphenol A, M.W. 375, epoxy equivalent 192 (available commercially from Shell Chemical Co. under the trade designation "Epon 828").
[2] Solid condensation product of epichlorohydrin and Bisphenol A, M.W. 950, epoxy equivalent 490, M.P. 65°–75° C. (available commercially from Shell Chemical Co. under the trade designation "Epon 1001").
[3] Epichlorohydrin-glycerine condensation product, M.W. 306, epoxy equivalent 150 (available commercially from Shell Chemical Co. under the trade designation "Epon 812").
[4] Bisphenol A diglycidylether-aliphatic dimer acid condensation product, epoxy equivalent 700 (available commercially from Shell Chemical Co. under the trade designation "Epon 872").
[5] Polyglycidyl ether of phenol formaldehyde novolak, epoxy equivalent 178 (available commercially from Dow Chemical Co. under the trade designation "D.E.N. 438").
[6] Diglycidyl ether of polypropylene oxide, epoxy equivalent 178 (available commercially from Dow Chemical Co. under the trade designation "D.E.R. 736").

EXAMPLE VIII

A solution of 5.2 gm. of 2,2,4-trimethylchromen and 4.4 gm. of resorcinol in 20 ml. of anhydrous ether was saturated with anhydrous hydrochloric acid and stirred at room temperature for 24 hours. The crystals that formed were removed by filtration and the filtrate washed with water, dried over sodium sulfate and the ether evaporated to give an oil. The crystals that formed on standing were collected, combined with the first mentioned crystals and recrystallized from a 1:1 mixture of toluene and ethyl acetate. The resulting crystals were sublimed at 170° C./0.1 mm. to give 5.8 gm., 68% yield of 2,2,4-trimethyl-4-(2,4-dihydroxyphenyl)chroman, M.P, 182–4° C. based on the chromen starting material. Elemental analysis is consistent with the proposed structure of the product:

Calc'd for $C_{18}H_{20}O_3$ (percent): C, 76.0; H, 7.1. Found (percent): C, 75.6; H, 7.1.

Treatment of the product with acetic anhydride in pyridine gave a diacetate, M.P. 106–8° C., from 1:1 hexane:benzene. The infrared spectrum showed no O—H absorption but had absorption at 5.7 microns and 5.75 microns, thus confirming the proposed molecular structure. Elemental analysis of the diacetate gave the following results:

Calc'd for $C_{22}H_{24}O_{25}$ (percent): C, 71.7; H, 6.5. Found (percent): C, 71.7; H, 6.4.

This new compound forms clathrates with many types of molecules as shown in the following table. The clathrates were prepared by dissolving the 2,2,4-trimethyl-4-(2,4-dihydroxyphenyl)chroman in the hot guest compound and collecting the crystals that formed on cooling. The ratio of host to guest was calculated from the weight loss on melting the clathrates.

TABLE II

| Guest | M.P., °C. | Percent Wt. Loss | Host/Guest Ratio |
|---|---|---|---|
| Acetic acid | 165–170 | 6.0 | 3.3:1 |
| Chloroform | 160–170 | 12.0 | 3.1:1 |
| Ethyl acetate | 170–175 | 3.0 | 10:1 |
| Ethanol | 160–165 | 5.5 | 2.8:1 |
| Octane | 175–180 | 5.5 | 6.9:1 |
| Diethyl ether | 165–175 | 3.5 | 7.2:1 |
| Acetone | 162–165 | 5.0 | 3.9:1 |

2,2,4 - trimethyl - 4 - (2,4 - dihydroxyphenyl)chroman also forms clathrates with amine catalysts such as o-dimethylaminomethylphenol. This clathrate is a good epoxy curative and demonstrates the principle of holding a reactive catalyst in a polyfunctional host compound.

Preparation

A mixture of 5 parts by weight of 2,2,4-trimethyl-4-(2,4-dihydroxyphenyl)chroman, 2 parts by weight of o-dimethylaminomethylphenol and 2 parts by weight of Decalin was heated until a clear solution was obtained and allowed to cool. The crystals that formed were collected, washed with toluene and vacuum dried at 80° C. to give a 50% yield of crystals, M.P. 120–140° C., N=0.9%.

100 parts by weight of "Epon 828" was mixed with 50 parts by weight of the clathrate and heated at 120° C. for 20 minutes to give a hard cured resin. Such a mixture has a shelf life of 2 weeks at room temperature whereas a resin mixture containing the unclathrated catalyst has a shelf life of just a few hours.

EXAMPLE IX

Polyacids may be crosslinked with polyamines to give cured polyamides. Examples of such polyacids are polyethylene oxides having benzoic acid end groups.

A mixture of 3.53 gm. of the polyethylene oxide triacid,

having an average molecular weight of about 1060 was mixed with 2.2 gm. of the Dianin's clathrate of 1,3-propanediamine and heated at 125° C. for 2 hours in an aluminum dish to give a cured crosslinked resin. A mixture such as this has a latency of at least 1 month and probably much longer.

Other clathrates of primary and secondary polyamines behave similarly and give cured polyamides.

EXAMPLE X

Latent curing polyesters can be prepared by mixing peroxides or other free radical initiators, which are stable at room temperatures, with polyester resins containing vinyl monomers such as styrene or acrylates. On heating, these initiators decompose to free radicals which cause the resins to polymerize and cure. The shelf life of these one-component systems is often short due to the formation of free radicals at room temperature which cause the resins to gel. The formation of the free radical catalysts is usually due to the induced decomposition of the peroxides by a component of the resin. Such induced decomposition may be prevented and the shelf life increased by preventing the initiator from coming in contact with the resin until cure is desired. This has been accomplished by enclosing the initiator inside a crystalline, insoluble, inclusion compound. On heating, the inclusion compounds melt and/or dissolve releasing the catalyst, causing it to cure the resin.

A lauroyl peroxide-urea inclusion compound was prepared as follows. Urea, 2 parts by weight, was dissolved in 16 parts by weight of refluxing tetrahydrofuran and just enough methanol to give a clear hot solution. A concentrated solution of 1 part by weight of lauroyl peroxide in tetrahydrofuran was added. The crystals that formed on cooling were collected and washed with tetrahydrofuran to give the inclusion compound, M.P. 129–132° C. with gas evolution.

A mixture of 20 parts by weight of a styrene polyester resin ("Laminac 4232"), and 0.1 part by weight of the finely ground inclusion compound were mixed and heated at 100° C. for 20 minutes to give a clear well cured resin. When stored at room temperature the resin had a shelf life of several months. At elevated temperatures, i.e. 45°–50° C. the resin containing the inclusion compound had a shelf life about double that of the resin with an equivalent amount of pure catalyst.

What is claimed is:
1. A curable epoxy resin composition comprising a flowable, curable epoxy resin and as a latent curing agent, a clathrate comprising crystals of 2,2,4-trimethyl-4-(2,4-dihydroxyphenyl)chroman having an amine guest substance entrapped therewithin which is not reactive with said chroman.

References Cited
UNITED STATES PATENTS 3,275,587  9/1966  Weller et al.
3,036,980  5/1962  Dunham et al.

FOREIGN PATENTS 882,738  11/1961  Great Britain.

OTHER REFERENCES

Hagan, M. Clathrate Inclusion Compounds, N.Y., Reinhold, 1962, pp. 13–15, 68–71 and 137–139.

MURRAY TILLMAN, Primary Examiner

WILBERT J. BRIGGS, SR., Assistant Examiner

U.S. Cl. X.R.

260—2.5, 47, 59, 75, 77.5, 78, 78.4, 345.5, 873